Patented Nov. 6, 1928.

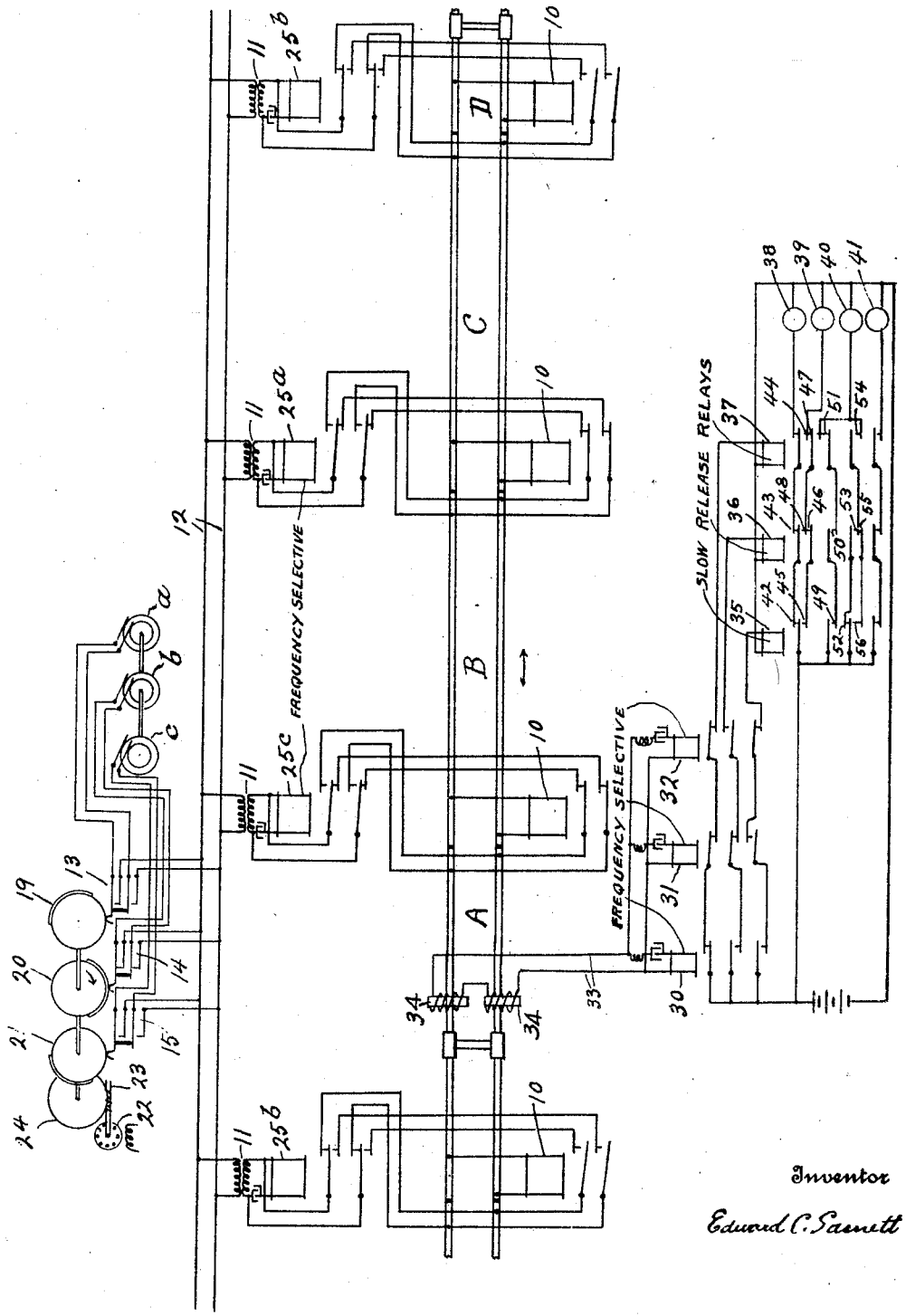

1,690,506

UNITED STATES PATENT OFFICE.

EDWARD C. SASNETT, OF WASHINGTON, DISTRICT OF COLUMBIA.

RAILWAY SIGNALING.

Application filed November 20, 1925. Serial No. 70,325.

The present invention relates to railway signaling and more particularly to automatic cab signaling and train control; the object of the invention in general is to produce a dynamic train control system which is immune to extraneous currents, in so far as concerns the giving of false, clear and caution indications, and to produce a system of this character that is economical in copper and current consumption. More particular objects and advantages of the invention will become apparent hereinafter.

The accompanying drawing illustrates diagrammatically a form in which the invention may be embodied.

Referring to the drawing, there is shown a stretch of track divided into blocks A, B, C and D. A track relay 10 is connected across the rails at the entrance end of each block and the secondary of a transformer 11 is adapted to be connected across the rails at the exit end of each block in a manner hereinafter pointed out.

The primaries of transformers 11 are connected to a pair of line wires 12 leading from a central station throughout the signaled territory. Alternating currents of three different frequencies are adapted to be connected across the line wires successively and periodically by switch mechanism located at the central station. The frequencies of the alternators may be of any suitable orders, but they should not be harmonically related and should preferably be of low orders. The mechanism shown for this purpose comprises three switches 13, 14 and 15 connected to alternators $a$, $b$ and $c$ and periodically operated by cams 19, 20 and 21. The cams are rotated at a constant angular velocity by motor 22 the armature of which is rigid with a worm 23 which meshes with a worm wheel 24 rigid with the cams. The raised portions of the cams may extend through any desired arc and are successively displaced from each other, so that the switches 13, 14 and 15 are successively operated to circuit closing positions during each revolution of the cams.

In the instantaneous positions shown switch 14 is held closed by cam 20 thus connecting alternator $b$ across the line wires 12. When the raised portion of the cam 20 leaves switch 14 the raised portion of cam 19 will engage switch 13 thereby connecting alternator $a$ across the line wires, and when cam 19 disengages switch 13 cam 21 will engage switch 15 and connect alternator $c$ across the line wires.

Associated with each track relay is a relay 25 having an exponent corresponding to the alternator to which it is responsive, these relays being permanently connected with the secondary of the respective transformer 11. These relays are arranged in groups of three with relays of the same groups respectively responsive to currents of the frequencies transmitted by alternators $a$, $b$ and $c$ and with corresponding relays of the several groups responsive to current of the same frequency. The relays $25^a$, $25^b$ etc. may be made selectively responsive to the different frequencies electrically by adjusting the inductance and capacity in their circuits, or mechanically, by providing the relays with reed armatures tuned to the respective frequencies, as is well understood in the art. In the positions shown, alternator $b$ is connected across the line wires and relays $25^b$ and all corresponding relays are accordingly energized. An instant later alternator $a$ will be connected to the line wires, energizing relays $25^a$ and all corresponding relays throughout the system; then alternator $c$ will be connected across the line wires energizing relays $25^c$. It will be clear therefore that during each cycle of operations, or each revolution of the cams, the relays of each group will pick up successively, corresponding relays of the several groups picking up simultaneously. It will be observed that when the relays pick up they close a direct connection from the secondaries of transformers 11 to the track rails of the blocks immediately in rear thereof, and that when said relays are deenergized they connect the secondaries of the transformers to the track rails through front contacts of their associated track relays.

In the drawing, a vehicle is represented in block A and an advance vehicle in block D. Current of the frequency of alternator $b$ is being transmitted from the secondary of transformer 11 associated with relay $25^b$ through the front contacts of said relay, through the track rails of block C and the track relay of block C, causing said track relay to pick up and transmit current of the same frequency from the secondary of transformer 11 associated with relay $25^a$ through the back contacts of said relay and the front contacts of the track relay through the rails of block B and the track relay connected thereto and from the secondary of transformer 11 associated with relay 25$^c$ through the back contacts of this relay and the front contacts of the track relay connected to block B and through the track rails of block A and the wheels and the axles of the vehicle.

When switch 13 closes alternator $a$ is connected across the line wires delivering current of 20 cycles to said line wires and causing relay 25$^a$ and corresponding relays to pick up. This will cause current from the secondary of transformer 11 to flow through front contacts of relay 25$^a$ through the track rails of block B and the track relay 10 connected thereto, thus transmitting current of the same frequency from the transformer 11 associated with the relay 25$^c$ through the back contacts of this relay and the front contact of the track relay connected to block B, through the track rails of block A and the wheels and axles of the vehicle. When switch 15 closes alternator $c$ is connected across the line wires 12 to said wires causing relays 25$^c$ to pick up. The current of this frequency therefore will be transmitted through the front contacts of relay 25$^c$ directly to the rails of block A and through the wheels and axles of the vehicle. It will be seen therefore that under clear conditions currents of the frequencies of alternators $a$, $b$ and $c$ will flow through the rails of a block successively and periodically.

Under caution conditions, currents of only two frequencies will flow in the rails of a block. For example, assume the vehicle in block A to pass into block B with block D still occupied. It will be clear that due to the deenergization of track relay 10 connected to block D the only current that can flow in the track rails of block C is the current of alternator $b$ connected through the front contacts of the relay 25$^b$. This current is transmitted to the rails of block B through back contact of relay 25$^a$ and the front contacts of the track relay 10 connected to block C. Current of the frequency of alternator $a$ will flow into the rails of block B when relay 25$^a$ picks up. Hence under caution conditions currents of two frequencies will flow through the relays of the block successively and periodically. These frequencies may be $a$ and $b$ or $c$ and $b$ or $c$ and $a$, depending upon the particular two relays 25 that are between the occupied block and the block in which caution conditions obtain. If the vehicle should proceed into block C with block D still occupied, it would only pick up current of frequency $b$ from the rails of said block. Hence, under danger conditions current of one frequency only will periodically flow in the track rails of a block, this frequency may be $a$, $b$ or $c$ as will be obvious.

Track or cab signaling mechanism, or both, may be provided. The signaling mechanism illustrated is located in the cab and comprises three relays 30, 31 and 32 connected in parallel to conductors 33 leading to coils 34 inductively disposed with relation to the current flowing in the track rails, relays 35, 36 and 37 controlled by the aforesaid relays and signal lamps 38, 39, 40 and 41 controlled by relays 35, 36 and 37. Relay 30 is selectively responsive to frequency $b$; relay 31, to frequency $a$; and relay 32, to frequency $c$. It will be understood from the foregoing that all three of these relays will be successively energized at regularly recurring intervals under clear conditions; that under caution conditions only two of the relays will be successively energized at recurring intervals, and under danger conditions only one of the said relays will be energized at recurring intervals. These relays may be of any suitable character, electro-magnetic, hot wire, or thermo-electric, and if desired a suitable amplifying device may be inserted between the relays and the track contacts. It is to be noted that due to the dynamic character of the system very sensitive relays may be employed with perfect safety. When relay 30 is energized, the circuit of relay 37 is closed through the front contact of relay 30 and the back contacts of relays 31 and 32. Similarly when relay 31 is energized the circuit of relay 35 is closed through the front contact of relay 31 and back contacts of relays 30 and 32; and when relay 32 is energized the circuit of relay 36 is closed through the front contact of relay 32 and back contacts of relays 30 and 31. Relays 35, 36 and 37 are slow release relays, that is they do not open their front contacts as long as they are energized successively within the time interval for which the system is designed. If it be assumed that the cams make a complete revolution every three seconds, it follows that under clear conditions each relay 35, 36 and 37 will be energized for a period of one second every three seconds. As long as these relays are thus intermittently energized, they will hold closed their front contacts and hold open their back contacts. As the circuit of clear lamp 38 passes through front contacts of relays 35, 36 and 37 in series, this lamp will be illuminated under clear conditions. Under caution conditions only two of the relays will be intermittently energized. If these two are relays 35 and 36 the circuit of the clear lamp will be interrupted at the front contact of relay 37 and the circuit of the caution lamp 39 will be closed at front contacts 42 and 43 and back contacts 44. If the two relays are 36 and 37, the circuit of the caution lamp will be closed at back contact 45 and front contacts 46 and 47; and if the two are 35 and 37, circuit of said lamp will be closed at the front contact 42, back contact 48 and front contact 47. Under danger conditions only one of the relays 35, 36 and 37 will be intermittently energized. If this one is 37 the circuit of danger lamp 40 will be closed at back contacts 49, 50 and front contact 51; if 35, the circuit of said lamp will be closed at front contact 52, back contacts 53, 54; and if the relay is 36, the circuit of said lamp will be closed at front contact 55, back contacts 56 and 54. When no current at all is received, circuit of lamp 41 will be closed through the back contacts of the three relays in series.

I claim:—

1. A railway signaling system, comprising a track divided into blocks, a track relay connected across the rails at the entrance end of each block, a line wire, means at a central station for successively and periodically connecting sources of alternating current of different frequencies to said line wire, a selective relay for each block connected to said line wire, said relays being arranged in successive groups with relays of the same group responsive respectively to currents of different frequencies and corresponding relays of the several groups responsive to current of the same frequency, connections from the line wire to the exit ends of the blocks closed independently of the track relays when said selective relays are energized and closed through front contacts of the track relays when the selective relays are deenergized, and signaling mechanism connected to the track rails selectively responsive to the frequencies of the currents flowing through the track rails.

2. A railway signaling system comprising a track divided into blocks, a track relay connected across the rails at the entrance of each block, selective means associated with a plurality of successive blocks for periodically applying alternating currents of different frequencies respectively to said plurality of blocks independently of the track relays and for periodically applying alternating currents of different frequencies to said blocks through front contacts of the respective track relays, and signaling mechanism selectively responsive to the currents flowing through the track rails.

3. A railway signaling system comprising a track divided into blocks, a track relay connected across the rails at the entrance end of each block, a selector for each block operable from a central station, a plurality of successive selectors operating successively to connect alternating energy of different frequencies respectively to the track rails at the exit ends of said successive blocks independently of the track relays, and means for connecting alternating energy to the exit ends of said blocks when the respective track relays are energized.

4. A railway signaling system comprising a track divided into blocks, a track relay connected across the rails at the entrance end of each block, a selective relay for each block controlled from a central station, said relays being arranged in successive groups with relays of the same group operating successively and corresponding relays of the several groups operating synchronously, and means for applying alternating energy of different frequencies to the track rails at the exit end of each block alternately through front contacts of the selective relays independently of the track relays and through back contacts of the selective relays and front contacts of the track relays.

5. A railway signaling system comprising a track divided into blocks, a track relay connected across the rails at the entrance end of each block, a line wire, means at a central station for connecting sources of alternating current of different frequencies to said line wire successively and periodically, a selective relay for each block connected to said line wire, said relays being arranged in successive groups, with the relays of the same group respectively responsive to currents of different frequencies and corresponding relays of the several groups responsive to current of the same frequency, means for connecting electrical currents to the track rails at the exit ends of the blocks independently of the track relays when said selective relays are energized, and for connecting electrical currents to said rails through front contacts of the track relays when the selective relays are deenergized and signaling mechanism controlled by the current flowing through the track rails.

6. A railway signaling system, comprising a track, track relays connected across the rails at spaced points, a line wire, means at a central station for successively and periodically connecting sources of alternating current of different frequencies to said line wire, a selective relay associated with each track relay, said selective relays being arranged in successive groups with relays of the same group responsive respectively to currents of different frequencies and corresponding relays of the several groups responsive to current of the same frequency, connections from the line wire to the exit ends of the blocks closed when said selective relays are energized and closed through front contacts of the track relays when the selective relays are deenergized, and signaling mechanism connected to the track rails selectively responsive to the frequencies of the currents flowing through the track rails.

7. A railway signaling system, comprising a track divided into blocks, a track relay connected across the rails at the entrance end of each block, selective means at each block, controlled from a central station for successively and periodically applying alternating currents to the rails at the exit ends of the blocks, the application of currents being controlled by the respective track relays, and signaling mechanism selectively responsive to the currents flowing through the track rails.

8. A railway signaling system comprising a track divided into blocks, a track relay connected across the rails at the entrance end of each block, a selector for each block operable from a central station and operating jointly with the respective track relays to connect alternating currents of different frequencies successively to the track rails at the exit ends of the blocks and signaling mechanism selectively responsive to the current flowing through the track rails.

9. A railway signaling system comprising a track divided into blocks, a track relay connected across the rails at the entrance end of each block, a selective relay for each block controlled from a central station, said relays being arranged in successive groups with relays of the same group operating successively and corresponding relays of the several groups operating synchronously, and means for applying alternating energy of different frequencies to the track rails at the exit end of each block alternately through front contacts of the selective relays and through back contacts of the selective relays in series with front contacts of the track relays.

10. A railway signaling system comprising a track divided into blocks, a track relay connected across the rails at the entrance end of each block, a line wire, means at a central station for connecting sources of alternating current of different frequencies to said line wire successively and periodically, a selective relay for each block connected to said line wire, said relays being arranged in successive groups, with the relays of the same group respectively responsive to currents of different frequencies and corresponding relays of the several groups responsive to current of the same frequency, means for connecting electrical energy to the track rails at the exit ends of the blocks when said selective relays are energized, and for connecting electrical energy to said rails through front contacts of the track relays when the selective relays are deenergized and signaling mechanism controlled by the current flowing through the track rails.

11. A railway signaling system comprising a track divided into blocks, a track relay connected across the rails at the entrance end of each block, means controlled at a central station for successively and periodically applying alternating currents to the rails at the exit ends of the blocks, the application of currents being controlled by the respective track relays, and signaling mechanism selectively responsive to the currents flowing through the track rails.

12. A railway signaling system comprising a track divided into blocks, a track relay connected across the rails at the entrance end of each block, means controlled at a central station and by the respective track relays for connecting alternating currents of different frequencies successively to the track rails at the exit ends of the blocks and signaling mechanism selectively responsive to the currents flowing through the track rails.

13. A railway signaling system comprising a track, track relays connected across the rails at spaced points, means controlled at a central station for successively and periodically applying alternating currents to the rails, the application of currents being controlled by the respective track relays, and signaling mechanism controlled selectively by the currents flowing through the track rails.

14. A railway signaling system comprising a track, track relays connected across the rails at spaced points, means controlled at a central station and by the respective track relays for connecting alternating currents successively to the track rails, and signaling mechanism controlled by the currents flowing through the track rails.

15. A railway signaling system comprising a track divided into blocks, a track relay connected across the rails at the entrance end of each block, a selective relay associated with each track relay and controlled from a central station, said selective relays being arranged in successive groups with relays of the same group operating successively and corresponding relays of the several groups operating synchronously, means controlled by the respective track relays and their associated selective relays for applying alternating currents successively to the track rails at the exit end of each block, and signaling mechanism controlled by the currents flowing through the track rails.

16. A railway signaling system comprising a track divided into blocks, a track relay connected across the rails at the entrance end of each block, a selective relay associated with each track relay and controlled from a central station, said selective relays being arranged in successive groups with relays of the same group operating successively and corresponding relays of the several groups operating synchronously, means controlled by the respective track relays and their associated selective relays for applying alternating currents of different frequencies successively to the track rails at the exit end of each block, and signaling mechanism selectively controlled by the currents flowing through the track rails.

17. A railway signaling system comprising in combination with a track divided into blocks, a track relay connected across the rails at the entrance end of each block, means for applying electrical energy of two frequencies alternately and periodically to the rails at the exit ends of the blocks, one frequency being applied directly to the rails and the other frequency being applied through front contacts of the adjacent track relays.

18. A railway signaling system comprising a stretch of track, relays connected across the rails at spaced points, means for applying to the rails adjacent said points respectively alternating energy of two frequencies alternately and periodically, one frequency being applied through front contacts of the adjacent track relays.

19. A railway signaling system comprising in combination with a track divided into blocks, a track relay connected across the rails at the entrance end of each block, means for applying electrical energy of two frequencies alternately and periodically to the rails at the exit end of each block, one frequency being applied through front contacts of the adjacent track relays.

20. A railway signaling system, comprising a track, means for connecting electrical current across the rails at a plurality of spaced points asynchronously, relays at spaced points along the track responsive to said current and adapted to apply current to the rails, and signaling mechanism responsive to current flowing through the rails.

21. A railway signaling system comprising a track divided into insulated blocks, means for connecting electrical current across the rails at the exit ends of a plurality of blocks asynchronously and periodically, means for relaying the currents from the exit to the entrance ends of the blocks, and signaling mechanism responsive to current flowing through the rails.

In testimony whereof I hereunto affix my signature.

EDWARD C. SASNETT.